Figure 9:
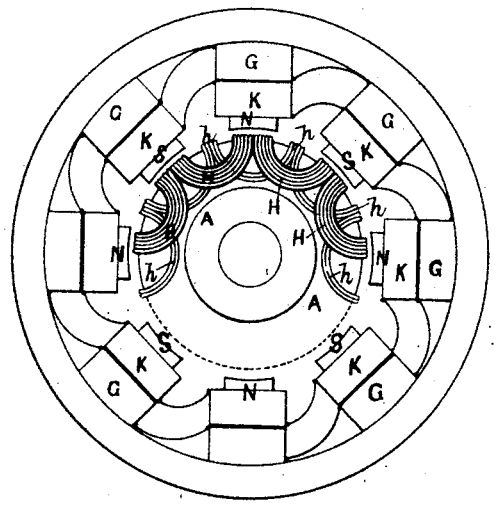

(No Model.) 2 Sheets—Sheet 1.
R. KENNEDY.
ELECTRIC MOTOR OR GENERATOR.
No. 470,199. Patented Mar. 8, 1892.
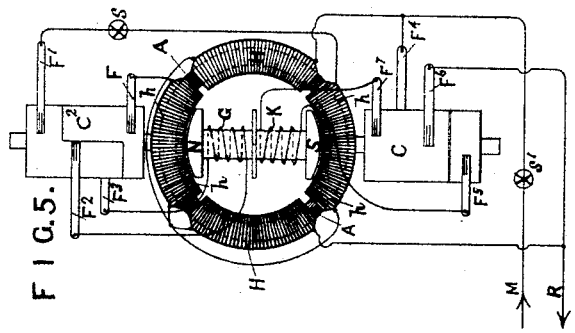
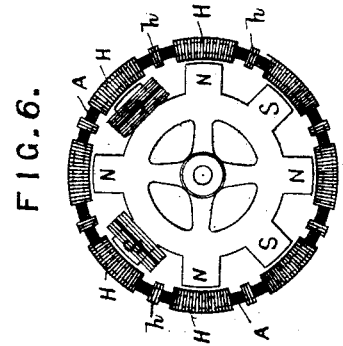
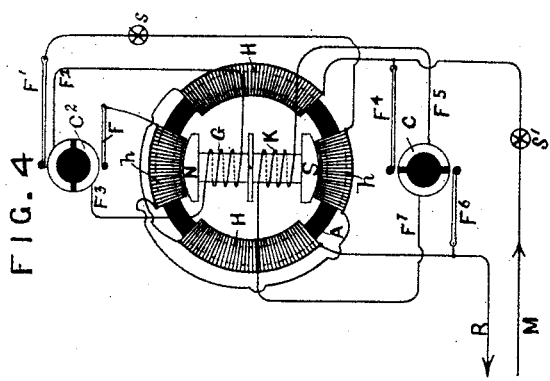
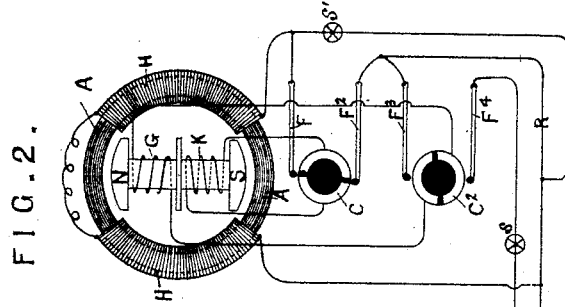
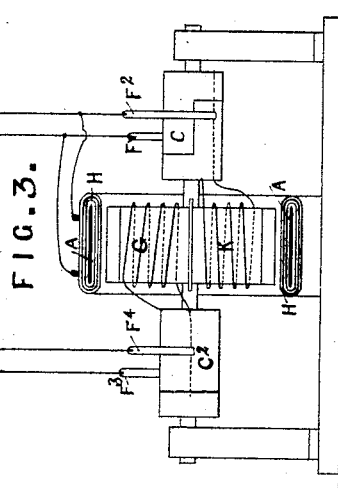
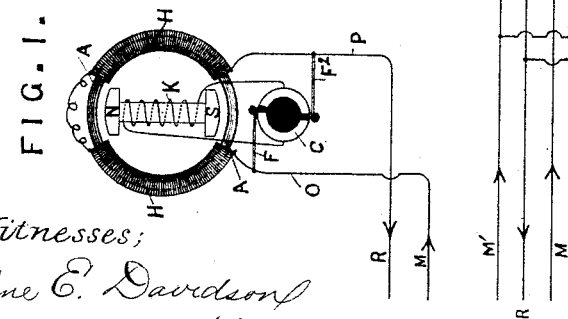
Witnesses:
Caroline E. Davidson
Irving W. Pope
Inventor:
Franklin Kennedy
by his Attorney
Franklin L. Pope (No Model.) 2 Sheets—Sheet 2.

R. KENNEDY.
ELECTRIC MOTOR OR GENERATOR.

No. 470,199. Patented Mar. 8, 1892.

Witnesses:
Caroline E. Davidson
Irving W. Pope

Inventor,
Rankin Kennedy
by his Atty Franklin L. Pope.

UNITED STATES PATENT OFFICE.

RANKIN KENNEDY, OF GLASGOW, SCOTLAND.

ELECTRIC MOTOR OR GENERATOR.

SPECIFICATION forming part of Letters Patent No. 470,199, dated March 8, 1892.

Application filed September 24, 1890. Serial No. 366,007. (No model.)

*To all whom it may concern:*

Be it known that I, RANKIN KENNEDY, a subject of the Queen of Great Britain and Ireland, residing at Glasgow, Scotland, have invented certain Improvements in and Relating to Electric Motors or Generators, of which the following is a specification.

My invention relates to improvements in self-exciting alternating-current motors or generators and appliances relating thereto.

For the purposes of my invention the field-magnets and the armatures of a motor or generator are provided with two independent windings of insulated wire, and these windings are respectively traversed by separate exciting-currents. The windings may be arranged either in shunt or in series relation to each other. The two currents which conjointly excite the field-magnets are unidirection intermittent or pulsating currents and are derived or translated from two independent alternating currents of like periodicity, but having a difference of phase equal or approximately equal to one-quarter of a complete period of alternation. These two alternating currents are generated in the respective windings of the armature, and by means of simple and well-known forms of commutators are each rectified, and thereby translated into separate pulsating or intermittent unidirection currents, which are so related to each other that the strength of each pulsation is at a maximum in one at the same instant that it is at a minimum in the other, and vice versa. When two such rectified currents are caused to pulsate in the respective coils or windings of the field-magnet, their conjunctive effect is obviously equivalent to that of a continuous unidirection current, and the magnetism induced thereby is approximately uniform in value.

My invention is applicable alike to motors and to generators, inasmuch as these, as is well understood, are reversible machines, the first being driven by the current and the second producing a similar current when itself is driven by some external motive power.

According to my invention, when only a single current is supplied alternating at a given periodicity, a second current alternating at the required difference of phase is generated by inductive action in the coils surrounding the armature of the motor or dynamo embodying the invention. The coils on the armature are exciting-coils and are electrically connected with the second series of coils upon the field-magnet.

It is necessary that the field-magnet of the motor should be laminated, inasmuch as it has to be set in motion while an alternating current is traversing its field-coils. Dynamos, on the other hand, do not require to have laminated fields, because their magnetism remains uniform under all variations of speed when excited in the manner hereinafter pointed out.

Figure 7:
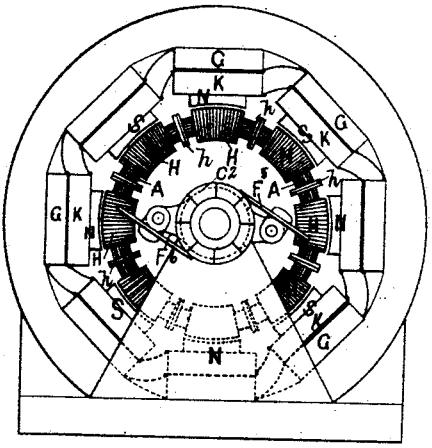
Figure 10:
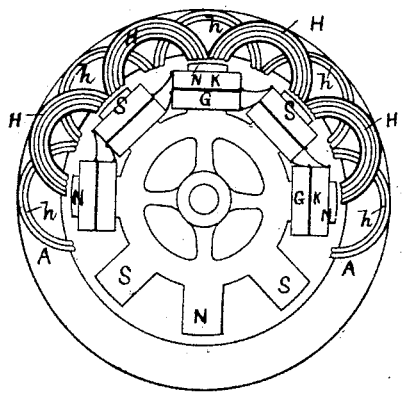
Figure 8:
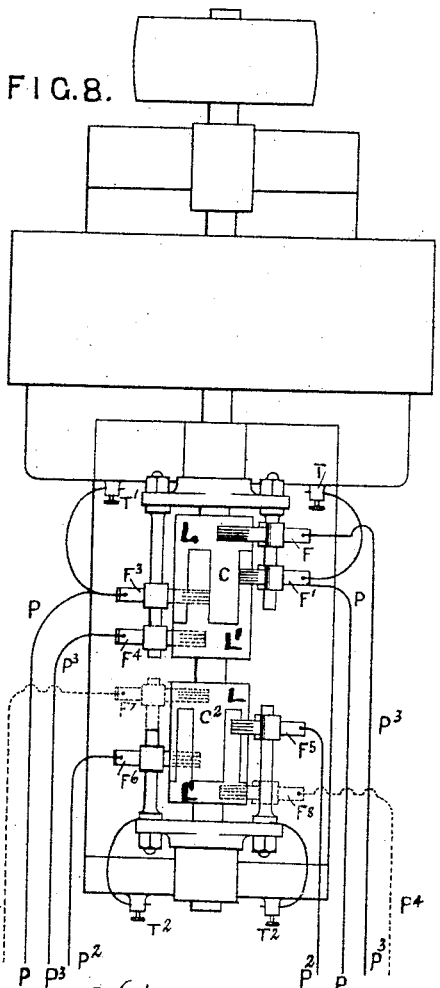

In the accompanying drawings, Figure 1 is a diagram elevation of an ordinary motor operated by a single line-current. Figs. 2 and 3, taken together, constitute a diagrammatical end view and elevation, respectively, at right angles to each other, of a motor constructed in accordance with my improvements. Figs. 4 and 5 are a similar diagrammatical end view and plan illustrating the transformation of an ordinary single-coil and field motor, such as shown in Fig. 1, into one of my improved motors, adapted to be operated by one alternating line-current. Fig. 6 is an end diagram of an organization equivalent to that shown in Figs. 4 and 5, but embracing a field-magnet with multiple poles and twice as many coils upon the armature as there are poles in the field. Figs. 7 and 8 are an elevation and plan, respectively, of a dynamo designed to produce two pulsating currents of equal periodicity, but differing from each other in phase by one-quarter of a period. Figs. 9 and 10 are diagrams illustrating a different plan of arranging the main and exciting coils upon cores of the drum form and the ring form, respectively.

Referring to Fig. 1, in which is shown a simple motor or generator of the ordinary construction, the field-magnet N S is mounted upon a shaft free to rotate, to which a two-part commutator C is also fixed. The stationary armature A A is a laminated iron ring encircling the field-magnet N S, and is wound with two windings of wire H and H. When an alternating current traverses the main leads M R, it divides at O and at P, part going in the stationary armature-coils H H and the remainder through the brushes F F² and through the commutator C into the field-magnet coil K. When this takes place, the field-magnet N S will begin to rotate under the influence of the currents traversing its coils, which are alternating and synchronous with those of the field-coils, but are reversed in relative direction therewith twice in each revolution. The speed of rotation of the field-magnet increases until a condition is reached in which the contact-springs F F² pass from one segment of the commutator to the other at a time which is coincident with the periodic reversal of the alternating current. When this condition is arrived at, the current in the field-magnet coil N S will necessarily be a pulsating unidirection current. The speed at which this effect is brought about may be called the "synchronizing" speed of the motor and may be determined theoretically by dividing the number of alternations of the current per second by half of the number of parts in the commutator. The motor develops its maximum power at this speed and will thereafter exhibit no tendency to exceed it.

The motor shown in Figs. 2 and 3 is provided with a double winding K and G on the rotating field-magnet N S, and two commutators C and C² are fixed upon the same shaft. This form of motor is adapted to operate with two alternating currents which are rectified before passing into the coils of the field-magnet N S after this has first been set in motion and brought to the synchronizing speed by working in the same manner as the simple motor of Fig. 1, hereinbefore described. This operation is effected by interrupting the circuit of the commutator C² by a switch s and closing the circuit of the commutator C by a switch s′, whereby it is put in circuit with the main supply-conductors M R. The current divides, as before, part going through the commutator C to the field-coil K and part through the armature-coils H H, precisely as in the motor hereinbefore described, and illustrated in Fig. 1. The motor of Fig. 2 having been brought to its synchronizing speed by means of the current controlled by the switch s′, another current, alternating at difference of phase from the first current of a quarter of a period, which is derived from the main leads M′ R, is turned through the commutator C², by which it is rectified, and thence passes into the second field-coil G. The magnetism of the field-magnets, being now generated by two rectified currents differing in phase, will be uniform in value, instead of pulsating, as in the case of the simple motor. It will be obvious that the current first turned onto the motor will divide, as heretofore explained, and will in part traverse the shunt, including the armature-coil H, while the other portion, passing through commutator C², will also pass directly through the field-magnet coil.

When only one current, alternating at a given phase, is supplied, the other current required is generated in the armature A by means of supplementary coils, which are wound upon it and which may be termed "exciting-coils." Figs. 4 and 5 illustrate a motor organized upon this principle. It has a single main M and return R, supplying an alternating current, a field-magnet N S, provided with a double winding K and G, and two supplementary coils h h, situated between the main coils H H, the function of which is to generate a secondary current having the proper phase. The exciting-coils h h will obviously generate currents alternating at a difference of phase of a quarter of a period from those in the main motor-coils H H. These secondary currents are rectified by commutator C² and passed into the field-coil G by closing switch s, connecting with brush F′, after the synchronism has been first attained, as hereinbefore explained, by turning on the current from the mains M R by the switch s′, which current passes through the commutator C to field-coil K, and also by the branch to the motor armature-coils H H.

In the forms of motor hereinbefore described I have shown in each case a simple field-magnet having two coils for each circuit; but in practice it is preferable in most cases to make use of multipolar magnets having twice as many coils on the armature as there are poles in the magnets. In Fig. 6, for example, the field-magnet has eight poles N S N S, &c. On the armature are eight motor-coils H H, &c., connected directly to the mains M R. Between these eight motor-coils are a corresponding number of exciter-coils h h, &c., connected in the manner hereinbefore explained through a rectifying-commutator to one winding of the field-magnet, the other winding of which is traversed by a current derived through a branch circuit and another rectifying-commutator from the mains M R.

In the modification illustrated in Figs. 7 and 8 the stationary field-magnets N S are double-wound, as shown at K and G, and are excited by two rectified alternating currents having a difference of phase equal to a quarter of a complete period. In case the dynamo is to supply one alternating current the exciting-coils h h upon the rotating armature may be small and are connected to a rectifying-commutator C², in which the currents are rectified before passing into the windings on the field-magnet N S. The commutator C, Fig. 8, is connected to the main coils H on the armature A and rectifies that portion of the current which passes through brushes F′ F³ and terminals T T′ to the second circuit G of the field-magnet coils X or K, while the alternating current is taken from the brushes F F⁴ on the undivided part of the commutator C by leads P³ P³ and is employed for such external work as may be required. When the dynamo is required to supply two alternating currents differing from each other in phase a quarter of a period, an additional pair of brushes F⁷ F⁸ are applied to the undivided part of the commutator C², as shown in dotted lines in Fig. 8, to take off the second current through the leads P⁴ P⁴. In this case the exciting-coils on the armature A may supply current for external use, and, in fact, under these conditions both circuits may supply external current as well as current for excitation.

In case two rectified alternating currents are required to be furnished by the dynamo having such difference or phase as to adapt them for use according to my invention one of them is obtained from the brushes F' F³ through leads P P and the other from brushes F⁵ F⁶ by the leads P² P².

In Figs. 9 and 10 are shown two windings of flat coils H h, which are laid on and the ends bent over and secured, as best seen in Fig. 9, to a drum-shaped core A, rotating within the fixed magnet N S, or, as shown in Fig. 10, to the inside of the fixed ring A, inclosing the rotating field-magnet N S N S, &c.

The rule for winding the armature is that all the coils H h on one circuit are to be so placed as to occupy a position of minimum induction at the moment those in the other circuit occupy a position of maximum induction. When so placed, the two windings will generate independent alternating currents of equal periodicity, but differing in phase by a quarter of a period.

I claim as my invention—

1. The hereinbefore-described method of operating an electric motor by alternating currents, which consists in maintaining an alternating current in the coils of both the field and armature until a speed has been reached which is synchronous with the pulsations of the actuating-current, and then transmitting through an independent winding of the field-magnet a second alternating current of like periodicity, but of different phase, the same having been first rectified by a commutator revolving at the synchronizing speed, as set forth.

2. In an electric motor or generator, a field-magnet, two independent windings upon said field-magnet, and two independent synchronously-rotating commutators connected, respectively, with said windings, in combination with a generator which transmits to each of said commutators an independent alternating current of like periodicity, but of dissimilar phase, which alternating currents are rectified by said commutators into pulsating unidirection currents before traversing the independent field-windings respectively connected therewith, substantially as set forth.

3. In an electric motor, a field-magnet, two independent windings upon said field-magnet, and two independent synchronously-rotating commutators connected, respectively, with said windings, in combination with a generator which transmits to one of said commutators an alternating current and an independent winding upon the armature-core of said motor which transmits to the other of said commutators an independent alternating current of like period, but of dissimilar phase from that derived from said alternating generator, both of which alternating currents are rectified by said commutators into pulsating unidirection currents before traversing the independent field-windings respectively connected therewith, substantially as set forth.

4. In an electric generator or motor, the combination of an armature and a field-magnet, each having two independent windings and two rectifying-commutators, having their respective diameters of commutation at right angles to each other, and contact-brushes which connect one winding on the armature with one winding on the field-magnet and the other winding on the armature with the other winding on the field-magnet, whereby two series of pulsating or intermittent direct currents of different phase are produced, substantially as set forth.

In testimony whereof I have signed my name to this specification in the presence of two subscribing witnesses.

RANKIN KENNEDY.

Witnesses:
W. R. M. THOMSON,
JOHN SIME.